(12) United States Patent
Solomon et al.

(10) Patent No.: US 6,401,152 B1
(45) Date of Patent: Jun. 4, 2002

(54) METHOD AND APPARATUS FOR AUTOMATICALLY ADJUSTING ELECTRICAL DEVICE ADDRESS IDENTIFICATIONS AND DATA ROUTING FOR A GROUP OF ELECTRICAL DEVICES

(75) Inventors: Gary A. Solomon, Hillsboro; Brad A. Barmore; Phil R. Lehwalder, both of Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/333,119

(22) Filed: Jun. 14, 1999

(51) Int. Cl.[7] .............................................. G06F 13/00
(52) U.S. Cl. ...................................... 710/104; 710/302
(58) Field of Search ............................. 710/8, 10, 104, 710/301, 302

(56) References Cited

U.S. PATENT DOCUMENTS 5,619,724 A * 4/1997 Moore ......................... 710/104
5,815,583 A     9/1998 Solomon et al. ............... 381/77

OTHER PUBLICATIONS

"Audio/Modem Riser Specification" Revision 1.01, *Intel Corporation*, Sep. 10, 1998.

"Audio Codec '97" Revision 2.1, *Intel Corporation*, May 22, 1988.

* cited by examiner

Primary Examiner—Glenn A. Auve
(74) Attorney, Agent, or Firm—Kenyon & Kenyon (57) ABSTRACT

A method and device are provided for managing a group of electrical devices, e.g., coder/decoders (codecs) in a computer system. Members of a group of electrical devices may be located on the motherboard of the computer system, or off the motherboard, such as on a riser card. An address ID module assigns a primary address to designate one of the devices as a primary device. The primary device performs certain functions that are only performed by a single device. Other devices are designated as secondary devices. A signal indicates whether a member of the group of electrical devices is located on the motherboard. If no device is located on the motherboard, the address ID module designates a primary device and secondary devices from among the devices located on the riser card. A routing module routes output signals from the devices to input pins of a controller. If a device is located on the motherboard, it is designated as the primary device by the address ID module, and the other devices are designated secondary devices. A routing module shifts the routing of the output signals from the secondary devices to different pins on the controller.

16 Claims, 6 Drawing Sheets

METHOD AND APPARATUS FOR AUTOMATICALLY ADJUSTING ELECTRICAL DEVICE ADDRESS IDENTIFICATIONS AND DATA ROUTING FOR A GROUP OF ELECTRICAL DEVICES

BACKGROUND OF THE INVENTION

The present invention pertains to a method and device for managing addressing functions in computers containing integrated circuits and similar electrical devices. More specifically, a method and device are provided for adjusting electrical device address identifications (IDs) and routing data for multiple electrical devices.

A codec (coder/decoder) is an integrated circuit or other electronic circuitry combining the circuits needed to convert digital signals into analog signals and to convert analog signals into digital signals. Audio codecs are used in computers, for example, on modem (modulator/demodulator) and sound cards to convert digital signals that can be read and stored by the computer into analog signals that can be transmitted over telephone wires or output to speakers for sound. Codecs on these devices also convert incoming signals from telephone wires or input sound signals, into a digital format that can be read, understood, and stored by the computer.

Traditionally, audio and modem hardware has been provided on separate boards that plug into a computer motherboard via industry standard expansion slots, for example, peripheral component interconnect (PCI) input/output expansion slots. See PCI Specification, Rev. 2.2 (1998) ("PCI Specification"), PCI Special Interest Group, Hillsboro, Oreg. Examples of these include modem cards and sound cards. Advantages in computer system design and production can be gained by providing audio and modem hardware on the computer system motherboard itself. The desktop system manufacturer can implement audio and/or modem solutions on the motherboard at lower cost and thereby make standard expansion slots in the system available for other additional plug-in peripherals. This design is described by the Audio Codec '97 Specification, version 2.1 ("AC '97 Specification"), published by Intel Corporation, Santa Clara, Calif. The AC '97 Specification defined a high-quality audio architecture and advanced the migration toward a completely digital audio system, while maintaining support for analog audio sources and analog interconnect for backwards compatibility. The original Audio Codec '97 specification provided for a two-chip audio solution. The design employed a controller chip and a codec chip, connected by a digital serial link, to process audio and modem signals (e.g., perform digital/analog conversions (DAC) and analog/digital conversions (ADC)).

A disadvantage of providing all the hardware of, for example, a modem on the motherboard is that the entire motherboard design approval and production process may be delayed pending approval of the modem hardware design by the Federal Communications Commission (FCC). This delay could significantly impact a computer manufacturer in the time-sensitive computer market. Furthermore, the modem attach rate in some cases does not warrant placing all the modem architecture "down" on the motherboard. Since there are multiple options for hardware manufacturers to place codecs in different locations, a flexible system is required for addressing codecs and routing codec signals to various components of the computer system.

Various systems exist for identifying and initializing various components that may be installed in computer systems. For example, computer systems employing so-called "plug-and-play" technology automatically detect when a new component has been plugged into the computer system. The plug-and-play components store information about their nature and resource requirements in their local non-volatile memories. System software and/or firmware reads the memory entries to determine the type of component and its characteristics, and can reconfigure software programs, including the operating system, to enable use of the new component. See PCI Specification. Systems such as these can be used to eliminate the need for a user to set switches or jumpers or to perform other difficult system configuration tasks.

An example of the use of a digital signal to auto detect the presence or absence of a hardware component is a presence detect signal for a memory chip (e.g., a dynamic random access memory (DRAM) dual in-line memory module (DIMM)). A presence detect signal is a means of identifying a memory chip to the memory controller logic of a computer system, using a pin on the memory chip to indicate presence detect information. For example, the Serial Presence Detect (SPD) scheme uses a serial EEPROM (electrically erasable, programmable, read-only memory) to store the presence detect information for a DRAM DIMM and requires only two pins (one for clocking it and one for data). Presence pins and their associated EEPROM, located on a DIMM module, indicate the presence or absence of the DIMM to the system motherboard.

None of these systems, however, provide a solution to the problem of allocating resources (e.g., bus resources) and managing addresses in, e.g., a multi-codec environment.

SUMMARY OF THE INVENTION

In one embodiment of the present invention, a method and device are provided for managing a group of electrical devices in a computer system including a group of electrical devices, an address ID module connected to each of said electrical devices, a routing module connected to at least one of said electrical devices, and an electrical device controller connected to the routing module. In this embodiment, the method includes the step of providing a presence signal, input to the address ID module and the routing module, to indicate whether one of the group of electrical devices is located on a motherboard. If the presence signal indicates that one of the group of electrical devices is located on the motherboard, the method includes the steps of operating the address ID module to assign a primary address to the electrical device located on the motherboard, and to assign a secondary address to at least one of the group of electrical devices (other than the electrical device located on the motherboard), and operating the routing module to route an output signal from at least one of the group of electrical devices (other than said electrical device located on the motherboard) to at least one input of the controller adapted for input from a secondary electrical device.

DETAILED DESCRIPTION

An example of a type of system employing auto detection of the presence or absence of a primary electrical device, and subsequent address ID assignment and routing functions is a computer system with an audio/modem riser. Although a specific embodiment is described for such a system, it is to be understood that the concepts described herein may be equally applied to any system of electrical devices requiring auto detection, address ID assignment, and signal routing.

A solution to the above problem of determining whether to provide audio/modem hardware on the motherboard or on a separate PCI plug-in card, is described in the Audio/Modem Riser Specification, version 1.01 (Sep. 10, 1998), Intel Corporation, Santa Clara, Calif. The Audio/Modem Riser specification describes a system that balances the cost advantages to be achieved by placing audio/modem hardware on the motherboard with the need to separate from the motherboard any portion of the system requiring government (e.g., FCC) approval, or which would delay motherboard design or manufacture for any other reason. The Audio/Modem Riser specification describes a system for providing certain audio/modem hardware elements (e.g., a codec controller chip) on the motherboard, while providing other elements (e.g., modem codec and data access arrangement (DAA) circuitry) on a combined audio/modem riser card. The riser card is connected to the motherboard via a riser interface that is built into the motherboard. Therefore, the provision of a riser board does not occupy a standard PCI input/output slot, leaving those slots available for use with other devices. Furthermore, the system described in the Audio/Modem Riser specification provides legacy compatibility and scalability, important features to manufacturers and consumers.

One consequence of designing a system with an audio/modem riser is that it may be desirable to provide a system with multiple codecs. For example, separate codecs may be provided for independent audio and modem analog front end ("AFE") functionality. In addition, computer systems including a laptop computer with a desktop docking station may include a codec in the laptop and another in the docking station. Computer systems with high-end audio capability (e.g., a six-channel Dolby® digital audio system) may use multiple codecs (e.g., three standard, two-channel codecs on a riser card) to implement the audio system. The provision of multiple codecs, however, leads to conflicts among the various codecs as they attempt to use the same resources (e.g., bus resources) to pass signals. Furthermore, conflict may result if no codec is designated as a primary codec, as some functions must be performed by a unique primary codec (e.g., the primary codec provides the clock for the other, secondary codecs and the controller). The prior art does not provide for the management of signals and address identifications (IDs) in a multiple codec environment, such as may be present in a system designed with an audio/modem riser.

Figure 1:
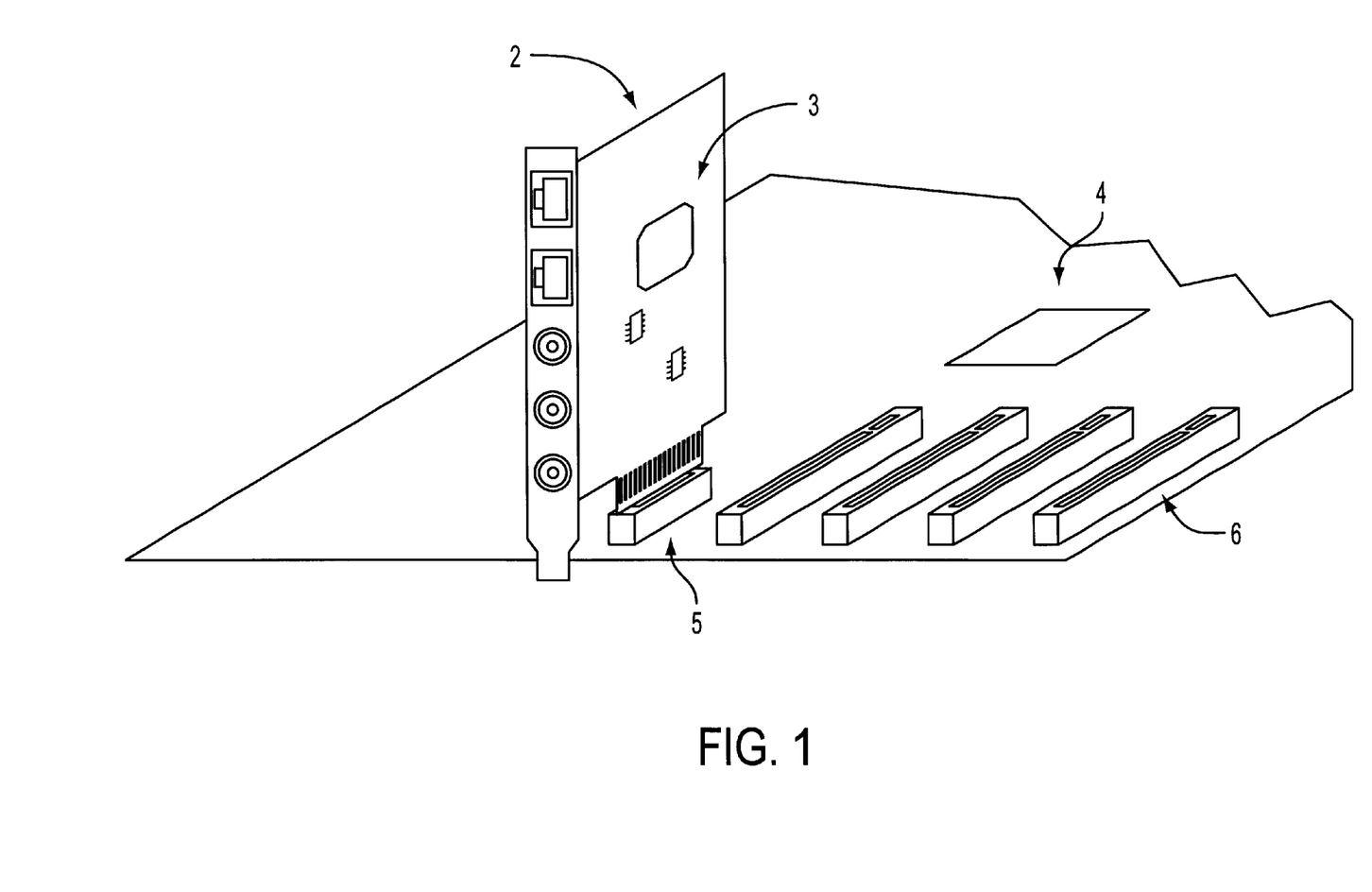
FIG. 1 is a drawing of an audio/modem riser card connected to a computer motherboard.

Referring to the drawings, FIG. 1 shows an embodiment of a riser module, in particular an audio/modem riser (AMR) card 2 connected to a motherboard 1, via a riser connector 5. The riser connector 5 is, for example, a system manufacturer, motherboard-only riser interface that is intended to be fully configured prior to the initial shipment of the system. The riser connector 5 is a backbone connection with, for example, support for power management and call progress monitoring capability. The riser connector 5 may contain, for example, a physical pin connection to send analog sound data (e.g., modem call monitoring data) directly to the output mixer on a motherboard codec. In contrast, the standard PCI input/output expansion slots 6 are generic retail-channel upgrade media designed to receive multiple types of hardware components. It is to be understood, however, that the invention is not limited to the specific riser connector 5 described, and the invention could function with multiple types of connectors, including the generic PCI connector slots 6.

In this embodiment, the hardware of the audio/modem system is divided between the motherboard 1 and the AMR card 2, with the AMR card 2 containing an audio and/or modem codec 3, and the motherboard 1 containing a controller chip 4. The controller chip 4 and the audio and/or modem codec 3 may comprise, for example, standard audio and/or modem chips available from any of a number of chip suppliers. Also shown attached to the motherboard in FIG. 1 are PCI input/output expansion slots 6, available to receive various peripherals that a manufacturer or a user may wish to install in the computer (e.g., a graphics card).

Figure 2:
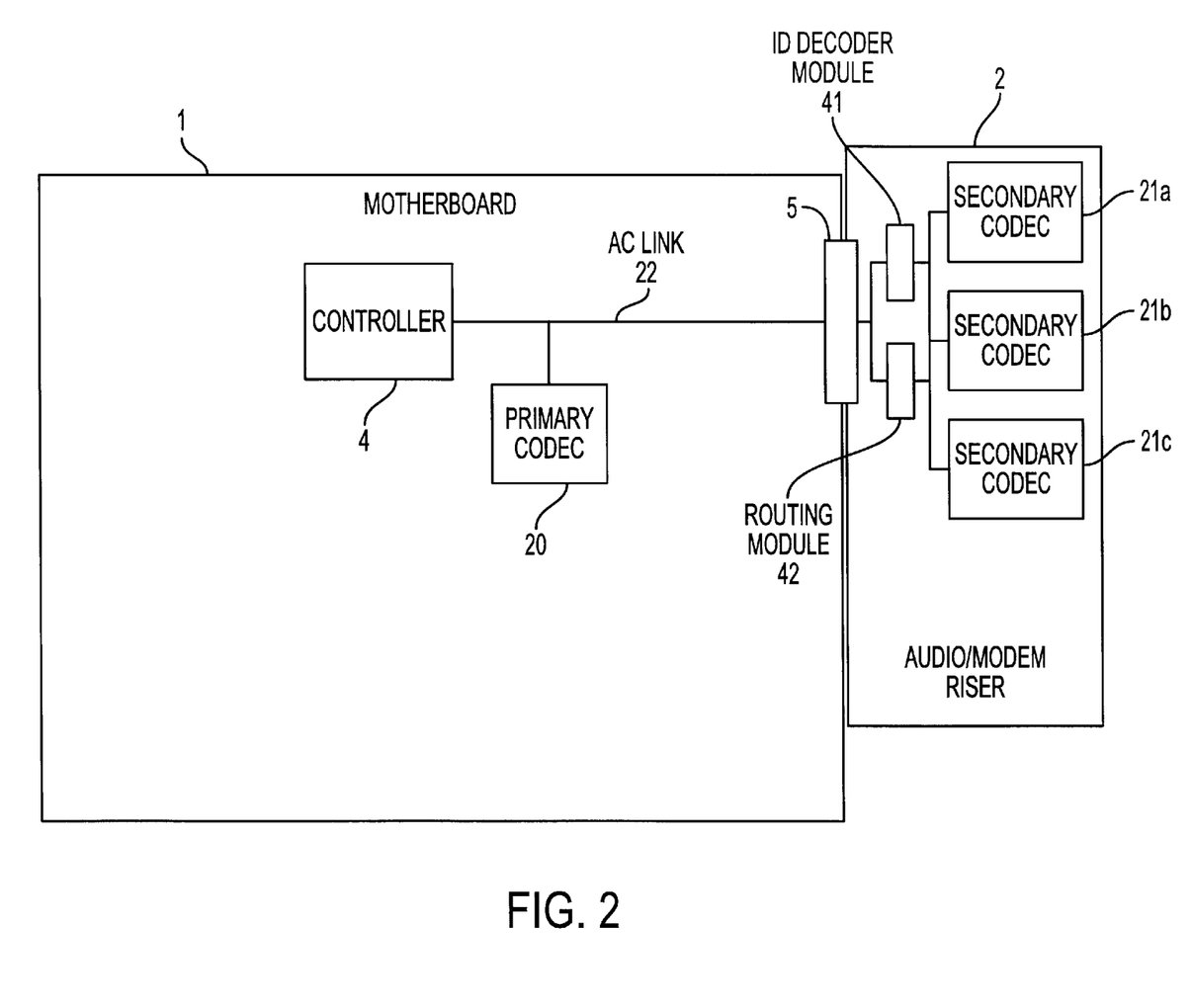
FIG. 2 is a block diagram of an embodiment of a multi-codec environment where the primary codec is located on the motherboard.

FIG. 2 shows a block diagram of an embodiment of a computer system with multiple electrical devices located both on a riser card and a motherboard. In the embodiment shown in FIG. 2, the riser card is an AMR card 2, which is attached to a motherboard 1 via a riser connector 5, and the electrical devices are codecs. Components of the audio and/or modem system are installed on the motherboard, including a controller chip 4 and a codec 20. The controller 4 and the codec 20 are linked to the AMR card 2 via an AC (audio codec) link 22. The AC link comprises, for example, an audio serial digital interconnect of the type described in U.S. Pat. No. 5,815,583. The AC link 22 connects the audio and/or modem components on the motherboard 1 with the audio and modem components of the AMR card 2. including codecs 21a–c, shown in FIG. 2. When multiple codecs 20, 21a–c are present in a computer system, there must be a mechanism to arbitrate among them, allocate use of system resources (e.g., buses), and route signals to the proper sub-systems devices.

A characteristic of some systems employing multiple electrical devices is that there may be functions that only one of the devices may perform. The device performing these functions may be designated, for example, a primary device, and the other devices secondary devices. According to an embodiment of the present invention, one of the codecs in a multi-codec environment is designated a primary codec 20. The primary codec 20 is assigned certain tasks that it alone can perform. For example, the primary codec 20 generates a master AC-link bit transfer clock (BIT_CLK) signal to synchronize the operations of the controller chip 4, the primary codec 20, and the secondary codecs 21a–c. See AC '97 Specification.

Figure 3:
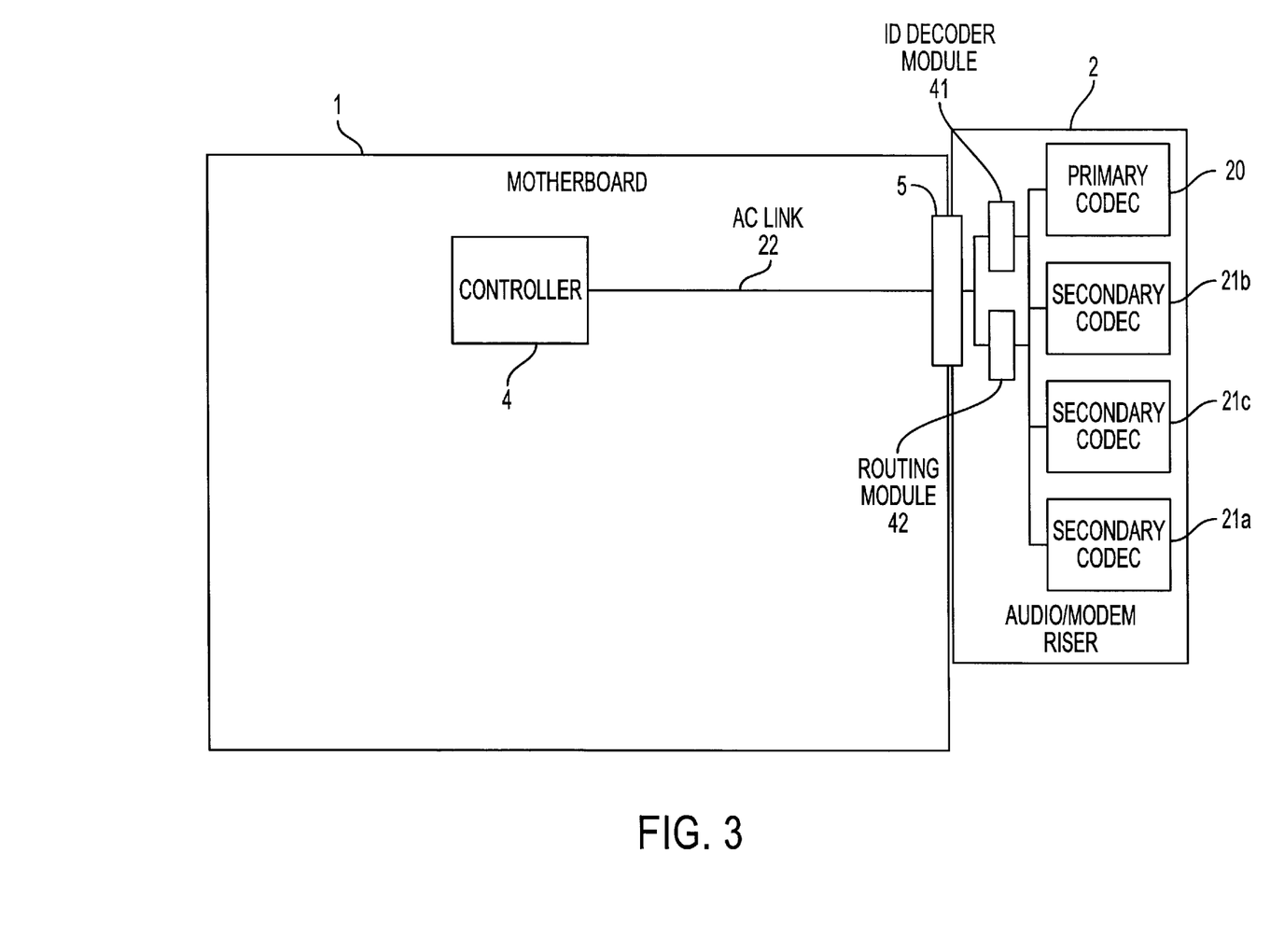
FIG. 3 is a block diagram of an embodiment of a multi-codec environment where the primary codec is located on an audio/modem riser.

FIG. 3 shows an embodiment where all codecs for the computer system are located on an AMR card 2. There is no codec located on the motherboard 1 and, therefore, no codec connected directly to the AC Link 22.

Figure 4:
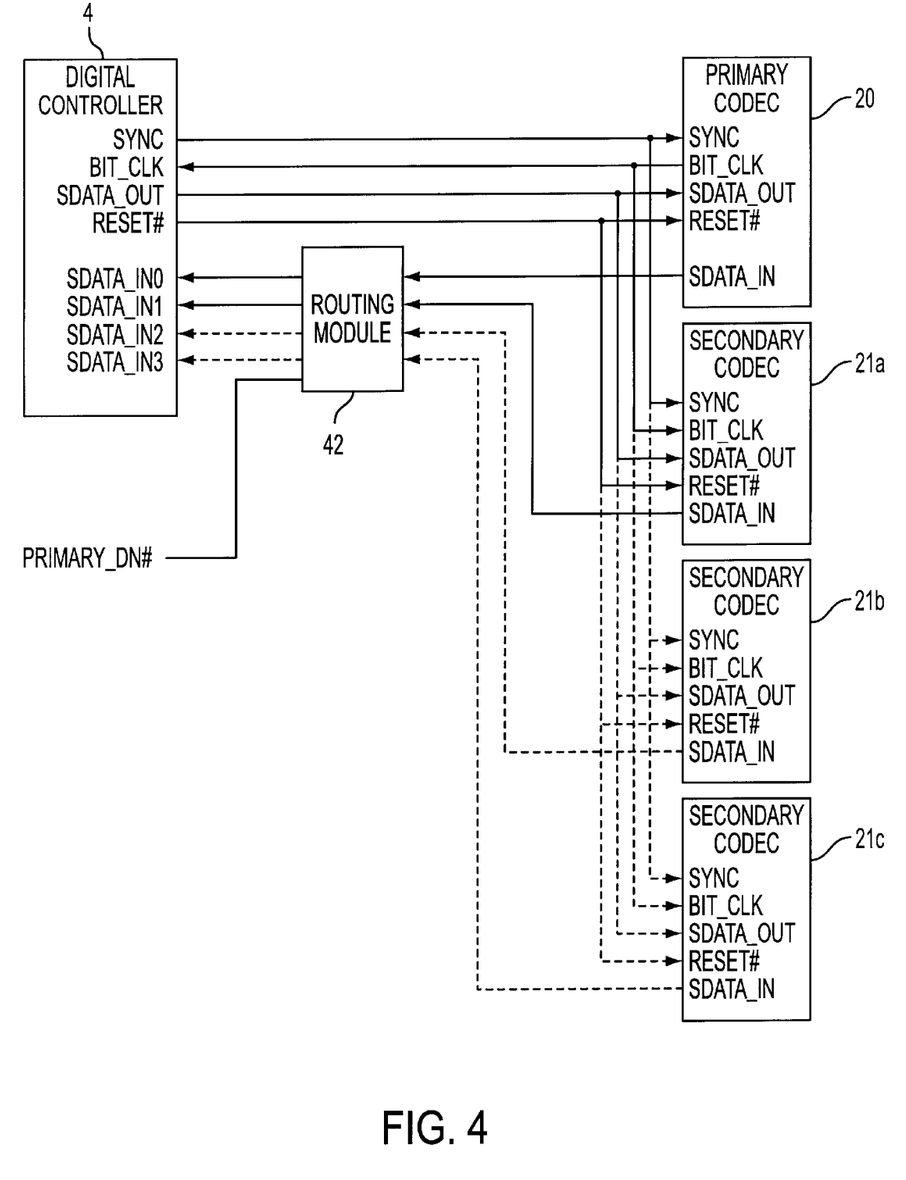
FIG. 4 is a schematic diagram showing the signal and pin configurations employed in an embodiment of the present invention.

In the embodiment shown in FIG. 4, connection lines between a digital controller 4 and four codecs in a multi-codec environment are shown. The connections between several of the pins of the codec and the controller chip 4 are shown, labeled with their associated signals. The SYNC (synchronization) pin on the controller 4 is connected to a SYNC pin on each of the primary codec 20, and the secondary codecs 21a–c. The SYNC signal may be, for example, a 48 kHz fixed rate sample signal used to synchronize the operation of the multiple codecs and the controller. The SYNC signal is driven by the controller 4. The controller 4 takes the BIT_CLK signal (described below) as an input and generates SYNC by dividing BIT_CLK by 256 and applying some conditioning to tailor its duty cycle. This yields a 48 kHz SYNC signal whose period defines an AC Link input/output frame (indicating audio and/or modem input/output). Data is transitioned on the AC-link 22 on every rising edge of BIT_CLK, and subsequently sampled on the receiving side of the AC-link 22 on each immediately following falling edge of BIT_CLK.

The BIT_CLK pin of the controller is connected to the BIT_CLK pins of the primary codec 20, and secondary codecs 21a–c. The BIT_CLK signal may be, for example, a 12.288 MHZ serial data clock. The BIT_CLK signal is an output signal of the primary codec 20 and an input to the secondary codecs 21a–c and the controller 4. used to synchronize their operation. The primary codec 20 derives its clock internally from an externally attached 24.576 MHZ crystal or oscillator (not shown), and drives a buffered and divided down (½) clock to the digital controller 4 as the BIT_CLK signal.

The RESET# pin of the controller 4 is connected to the RESET# pins of the primary codec 20, and the secondary codecs 21a–c. RESET# is an asynchronous input signal. A cold reset is achieved by asserting RESET# for the minimum specified time. By driving RESET# low, and then de-asserting it (driving it high again), the BIT_CLK, and SDATA_OUT (serial data out) signals will be activated, or re-activated as the case may be, and all codec control registers will be initialized to their default, power on, reset values.

The signals shown in the embodiment of FIG. 3 are named with respect to the controller 4. Therefore, the signals labeled SDATA_IN (serial data in) are signals that are input into the controller 4, and therefore are the output signals of the codecs 20, 21a–c. The SDATA_OUT signal is the output of the controller 4, and therefore carries the inputs to the codecs 20, 21a–c. The SDATA_IN signal is a digital data and control pipe between the controller 4 and a codec 20, 21a–c. For each codec 20, 21a–c, the SDATA_IN signal may be a serial, time division multiplexed, output stream that carries the digital output of the codec 20, 21a–c to the controller 4.

In one embodiment, the AC-link 22 supports twelve 20-bit slots at 48 kHz on SDATA_IN and SDATA_OUT. The time division multiplexed (TDM) "slot-based" architecture supports a per-slot valid tag infrastructure that the source of each slot's data sets or clears to indicate the validity of the slot data within the current audio frame. The AC-link's 22 tag infrastructure can be used to support transfers between the controller 4 and a codec 20, 21a–c at any sample rate. If desired, streams can be sent across the AC-link 22 in a negotiated, "tag interleaved" fashion, thereby eliminating the need for up-sampling to a common rate such as 48 kHz. For audio, optional AC-link 22 slot interleaved solutions enable the stream of the highest intended quality, either 44.1 or 48 kHz, to be sent along the AC-link 22 with no up-sampling required.

The SDATA_OUT signal, like the SDATA_IN, may be a serial, time division multiplexed, input (from the perspective of a codec 20, 21a–c ) stream. The audio output (from the controller) frame data streams correspond to the multiplexed bundles of all digital output data targeting a codec's 20, 21a–c DAC inputs and control registers. Each audio output frame supports, for example, up to twelve 20-bit outgoing data time slots. Slot 0 is, for example, a special reserved time slot containing 16-bits which are used for AC-link 22 protocol infrastructure. Within slot 0, the first bit is a global bit (SDATA_OUT slot 0, bit 15) which flags the validity for the entire audio frame. If the "Valid Frame" bit is a 1, this indicates that the current audio frame contains at least one slot time of valid data. The next 12 bit positions sampled by a codec 20, 21a–c indicate which of the corresponding 12 time slots contain valid data. In this way data streams of differing sample rates can be transmitted across an AC-link 22 at its fixed 48 kHz audio frame rate.

As stated above, in many systems with multiple electrical devices. certain functions (e.g., provision of a clock signal) can be performed by a single electrical device only. For example, in the computer system with multiple codecs described above functions such as the provision of the BIT_CLK signal may only be performed by a single codec. This codec is designated as the primary codec 20. The primary codec 20 generates the master BIT_CLK signal for the AC link 22, as well as the secondary codecs 21a–c. It can be seen, therefore, that only one primary codec 20 can be present in a computer system. It is important, therefore, to have a system to distinguish between the primary codec 20 and the secondary codecs 21a–c so that the primary codec 20 is "aware" that it is the primary and each secondary codecs 21a–c is "aware" of the fact that it is not a primary codec, and aware of which codec is the primary.

Each codec 20, 21a–c is identified, for example, by a codec address identification (ID) assigned to the codec. The codec ID identifies the codec so that it can receive the signals and data (e.g., from the controller) that are intended for it and ignore the signals and data that are not intended for it. The primary codec 20 is identified by a unique ID assignment (e.g., a two-digit binary number such as 00). The secondary codecs 21a–c are identified with, for example, sequential IDs assigned to each subsequent codec (e.g., 01, 10, 11). If there is only one codec in a computer system, that codec is the primary codec 20, by default. In multiple-codec systems. however, in some cases, all the multiple codecs will be placed on an AMR card 2, and in other cases one or more codecs will be placed on the motherboard.

In an embodiment of the present invention, if there is a codec down on the motherboard 1, connected directly to the AC link 22, that codec is designated as the primary codec 20. Other codecs 21 located on the motherboard 1 are designated as secondary codecs. The primary codec is assigned, for example an ID of "00" to designate it as the primary codec 20. Because an AMR card 2 may be manufactured separately from a motherboard 1, the AMR card 2 may contain a codec capable of acting as the primary codec 20, in the event that there is no primary codec 20 down on the motherboard 1. Since there may be a primary codec 20 down on the motherboard 1, and there can only be one primary codec 20 in a given computer system, the computer system must be capable of adjusting the ID assigned to the codecs built into the AMR card 2 to redesignate the codec that might ordinarily be designated as a primary codec 20 as a secondary codec 21. This can be done, for example, by shifting the AMR card codec to a secondary-codec ID (e.g., "01"). If there are remaining secondary codecs on the AMR card 2, the IDs of those codecs may have to be shifted as well, so that IDs remain unique to each codec. For example, if the AMR card codec that would ordinarily be assigned the "00" ID is shifted to an ID of "01," then the codec originally assigned the "01" ID may be shifted to an ID of "10," for example.

Where all of the electrical devices such as codecs, in a group of electrical devices are placed on either a motherboard 1 or a riser card, such as an AMR card 2, a manufacturer can easily designate one electrical device as a primary device. Where electrical devices such as codecs are found on both a motherboard 1 and a riser card such as an AMR card 2, a system is required for determining which device is to function as the primary device and distributing this information to the secondary devices (i.e., that those devices are not to function as primary devices). This system must allow the flexibility to design a single riser card with multiple electrical devices, one of which is capable of functioning as a primary device, while at the same time allowing such a riser card to detect a primary device on the motherboard and adapt the devices on the riser card to not attempt to function as a primary device.

Figure 5:
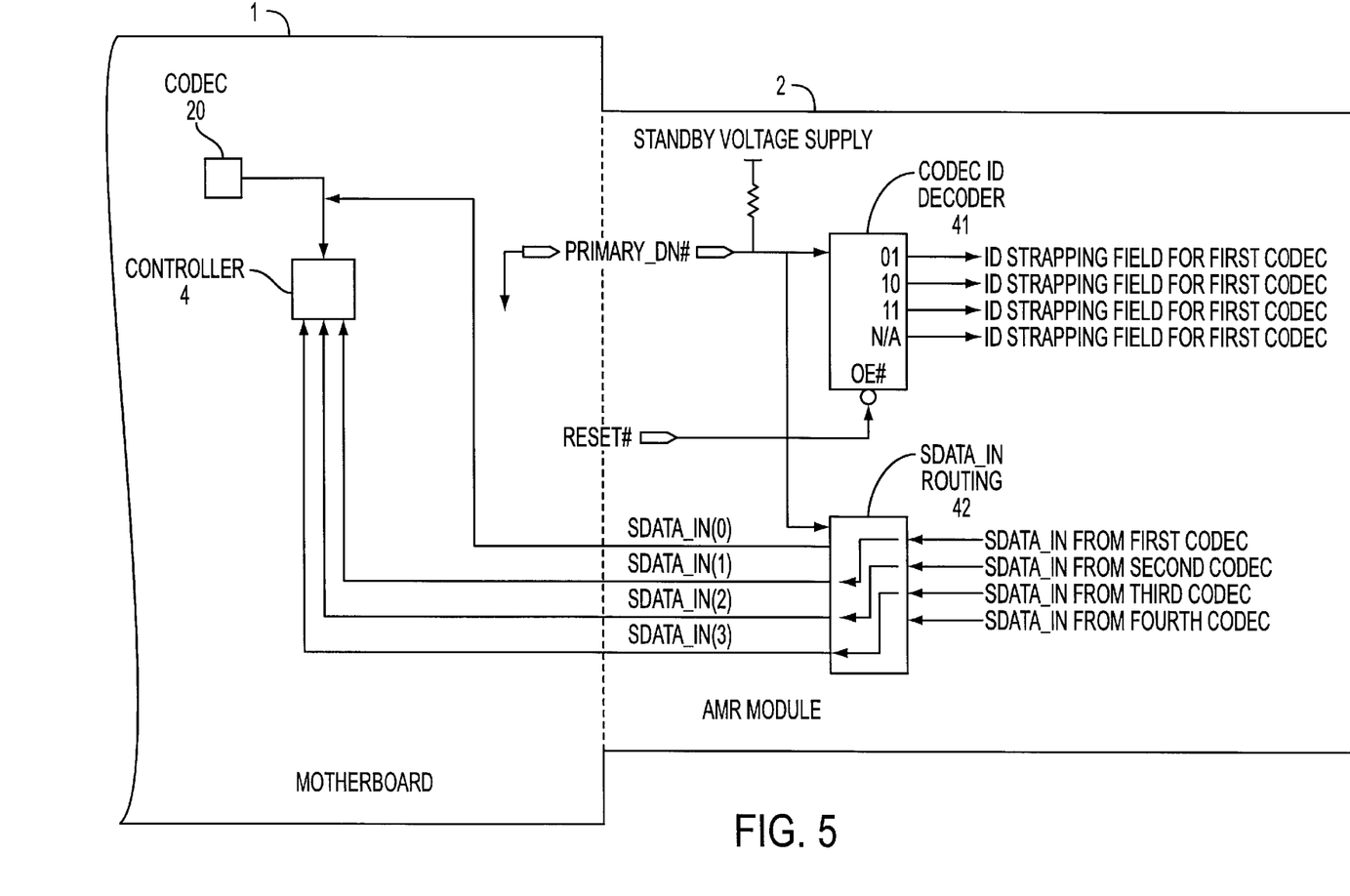
FIG. 5 is a schematic diagram showing an embodiment of the present invention where a codec is located on a computer system motherboard.

In the embodiment shown in FIG. 5, an ID decoder module 41 and a signal routing module 42 are shown. The ID decoder module 41 determines which electrical device (in this embodiment a codec) should receive which portion of a signal input to the electrical devices (in this example a multiplexed SDATA_IN signal) by mapping the tags contained in the signal to the device (codec) IDs. As shown in FIG. 4, the routing module 42 routes the output from each codec (the SDATA_IN signal) to the controller 4. The ID decoder module 41 of FIG. 5 and signal routing module 42 comprise encoder-type hardware, that can be constructed of any type of electrical hardware components (e.g., standard programmable array logic (PAL) chips, available from various manufacturers). These modules may be located, for example, on the AMR card 2. In one embodiment of the invention, the ID decoder module 41 and/or the routing module 42 may be integrally included in the codecs 20, 21a–c.

The routing module 42 may comprise, for example, a straight-through buffer with one or two gates. As shown in FIG. 5, when the routing module 42 detects that the PRIMARY_DN# signal is low, (indicating that there is a primary codec 20 down on the motherboard 1), the routing module 42 re-routes, for example the SDATA_IN signal from each of the AMR card 2 codecs to a different pin of the controller 4. Since the primary codec 20 is down on the motherboard 1, the SDATA_IN signal from the primary codec 20 may be already connected to the SDATA_IN0 pin, and may be thus designated the SDATA_IN0 signal. The routing module 42, therefore, routes the SDATA_IN signal from the first codec on the AMR card 2, not to the SDATA_IN0 pin, as it would if that codec was the primary codec, but to the SDATA_IN1 pin on the controller 4. Similarly, with each of the other codecs 21 on the AMR card 2, the routing module 42 routes the signals to, for example, the next pin down from the pin to which the SDATA_IN signal would be routed if there was no primary codec 20 down on the motherboard 1. For example, the SDATA_IN signal from the second AMR card codec is routed to the SDATA_IN2 line of the controller 4, and the SDATA_IN signal from the third AMR card codec is routed to the SDATA_IN3 pin of the controller 4. In the embodiment shown in FIG. 5, the maximum number of codecs allowed for the system is four, so the SDATA_IN signal of a fourth AMR card codec, if present, is not used.

When the RESET# signal is asserted to reset the system (e.g., when the computer system is re-booted), the codecs are initialized. As part of the initialization process, each codec determines its address ID, and therefore its position in the rank of codecs (e.g., primary or secondary) by examining the signal asserted on its address pin(s). In the embodiment shown in FIG. 6, each codec has two address pins. Therefore, the possible address IDs are "00," "01," "10," and "11." The ID decoder module assigns address IDs to the codecs found on both the motherboard and the AMR card 2. The ID decoder module 41 receives the PRIMARY_DN# signal as an input indicating that a hard wired primary codec is found on the motherboard 1 (for example, with an address of "00"). This address may be assigned by connecting both designated address pins of the primary codec to a logical "0" (e.g., a supply potential, as described in the AC '97 Specification). The ID decoder assigns address IDs to the secondary codecs, e.g., in the order in which the codecs are found on the AMR card 2. In this way, the codecs located on the AMR card 2 may be assigned different address IDs depending on whether there is a primary codec located on the motherboard 1.

Figure 6:
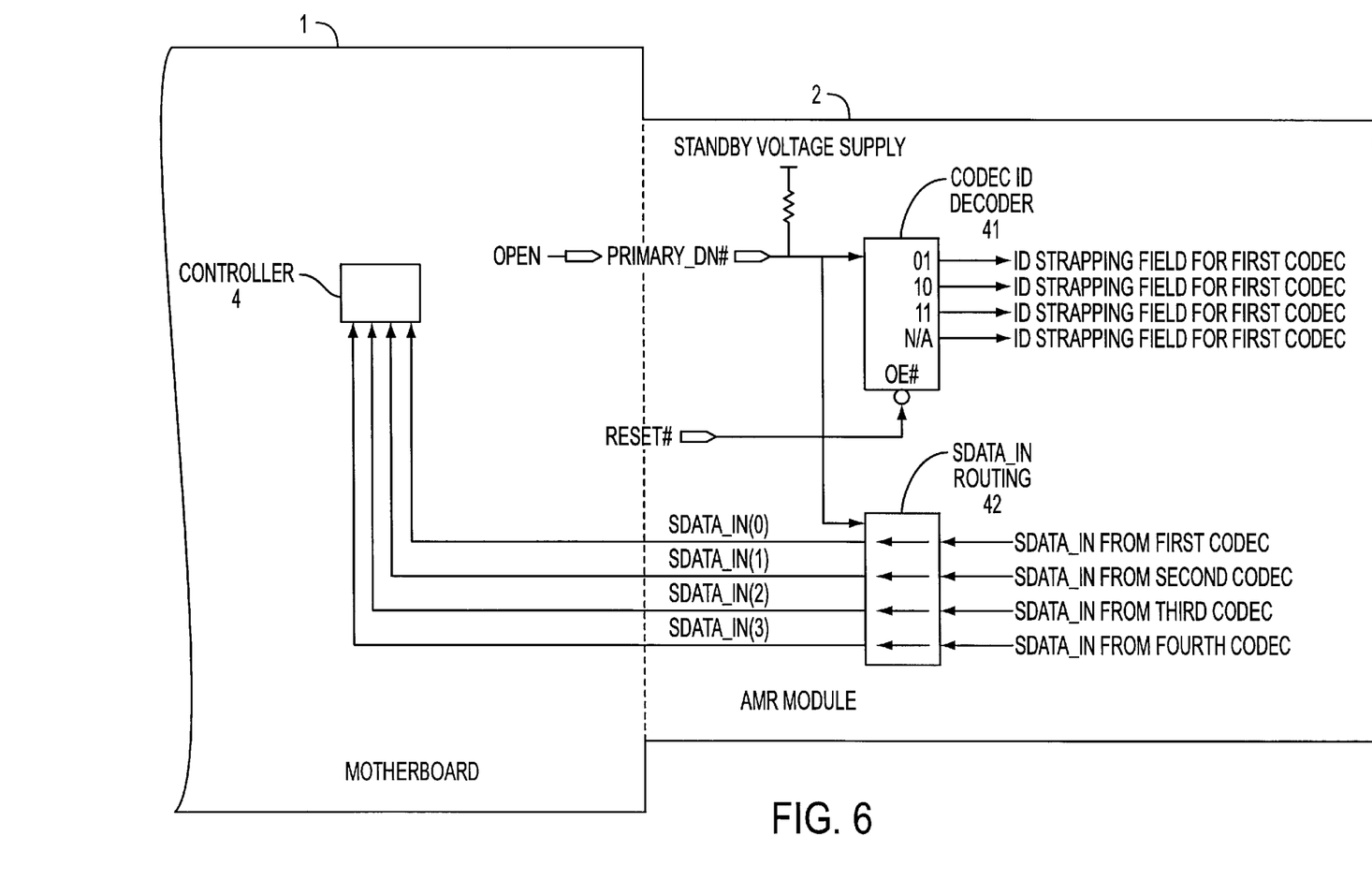
FIG. 6 is a schematic diagram showing an embodiment of the present invention where no codec is located on a computer system motherboard.

FIG. 6 shows an embodiment of the invention in which there is no primary codec 20 located on the motherboard 1. In the embodiment shown in FIG. 6, the ID decoder module 41 and the routing module 42 receive an open (high) PRIMARY_DN# signal, indicating that there is no primary codec located on the motherboard. When the RESET# signal is asserted (e.g., when the computer system is powered up), the ID decoder designates the first codec on the AMR card 2 as the primary codec 20 by assigning it the ID address for the primary codec 20 (e.g., "00"). The ID decoder module 41 assigns address IDs to the remaining codecs on the AMR card 2, for example, in sequential numerical order ("01," "10," "11"). In this manner, the first AMR card codec may be designated the primary codec and the remaining AMR card codecs may be designated secondary codecs.

When the routing module 42 receives a PRIMARY_DN# signal indicating that there is no primary codec located on the motherboard 1, the routing module 42 routes the SDATA_IN signal from the first (primary) codec to the SDATA_IN0 pin of the controller 4. The SDATA_IN signals from the subsequent codecs may be routed to the SDATA_IN1, SDATA_IN2, and SDATA_IN3 pins of the controller 4, respectively. Therefore, when there is no primary codec located on the motherboard, an embodiment of the present invention designates one of the codecs located on the AMR card 2 as the primary codec. The input signals to the controller 4 are routed to designated pins, and address IDs for receiving output signals from the controller are assigned to the codecs. When there is a primary codec located on the motherboard 1, its signal is routed to the pin of the controller 4 designated for the primary codec input. The routing module 42 routes the signals from the codecs on the AMR card 2 to the pins of the controller designated for the signals from the secondary codecs.

Although an embodiment of the invention has been described in terms of addressing and routing signals of codecs, it is to be understood that the scope of the invention, as defined in the claims, is broader than this exemplary application. The present invention, as defined in the claims, may be applied to any group of integrated circuits, or other electrical devices where it must be indicated whether an implementation of a device is found in a certain location, and the address IDs and routing of signals from other devices must be adjusted accordingly. Furthermore, it is to be understood that certain components of the invention described above as being implemented in hardware (e.g., a routing module, an address ID module) may also be implemented using software or a combination of hardware and software, with in the scope of the invention.

What is claimed is:

1. In a computer system including: a group of electrical devices, an address ID module connected to each of said electrical devices, a routing module connected to at least one of said electrical devices, and an electrical device controller connected to the routing module; a method for managing the group of electrical devices comprising: providing a presence signal, input to the address ID module and the routing module, to indicate whether one of the group of electrical devices is located on a motherboard; and if the presence signal indicates that one of the group of electrical devices is located on the motherboard:

operating the address ID module to assign a primary address to the electrical device located on the motherboard, and to assign a secondary address to at least one of the group of electrical devices (other than said electrical device located on the motherboard), and operating the routing module to route an output signal from at least one of the group of electrical devices (other than said electrical device located on the motherboard) to at least one input of the controller adapted for input from a secondary electrical device.

2. The method of claim 1, further comprising the steps of:

if the presence signal indicates that none of the group of electrical devices is located on the motherboard:

operating the address ID module to assign a primary address to one of the group of electrical devices, and to assign a secondary address to at least one of the group of electrical devices (other than the electrical device that was assigned the primary address); and operating the routing module to route an output signal from the electrical device assigned the primary address to an input of the controller adapted for input from a primary electrical device, and to route an output signal from at least one electrical device (other than the electrical device assigned the primary address) to at least one input of the controller adapted for input from a secondary electrical device.

3. The method of claim 2, wherein the group of electrical devices comprises a group of codecs.

4. The method of claim 2, wherein the computer system further comprises a riser module, connected to the motherboard, and including at least one of the group of electrical devices.

5. The method of claim 4, wherein the group of electrical devices comprises a group of codecs and the riser module comprises an Audio Modem Riser.

6. The method of claim 4, wherein:

if the presence signal indicates that none of the group of electrical devices is located on the motherboard, the routing module routes a signal from a first electrical device on the riser module to a default pin of the controller;

if the presence signal indicates that a second electrical device is located on the motherboard, the routing module shifts the routing of said signal from said first electrical device on the riser module to a pin of the controller other than said default pin.

7. A computer system comprising:
a motherboard;
a riser card connected to the motherboard;
a group of electrical devices;
an electrical device controller;
an address ID module connected to each of said electrical devices:
a routing module connected to at least one of said electrical devices;
a presence signal indicating whether one of the group of electrical devices is located on the motherboard, the presence signal input to the address ID module and the routing module;

wherein:

if the presence signal indicates that one of the group of electrical devices is located on the motherboard, the address ID module assigns a primary address to the electrical device located on the motherboard to designate said electrical device as a primary device, and assigns a secondary address to at least one of the group of electrical devices located on the riser card; and the routing module routes an output signal from at least one of the group of electrical devices located on the riser card to at least one input of the controller adapted for input from a secondary electrical device.

8. The computer system of claim 7, wherein:

if the presence signal indicates that none of the group of electrical devices is located on the motherboard, the address ID module assigns a primary address to one of the group of electrical devices to designate said electrical device as a primary device, and assigns a secondary address to at least one of the group of electrical devices; and the routing module routes an output signal from the primary device to an input of the controller adapted for input from a primary electrical device and routes an output signal from at least one of the group of electrical devices located on the riser card to at least one input of the controller adapted for input from a secondary electrical device.

9. The computer system of claim 8, wherein the group of electrical devices comprises a group of codecs.

10. The computer system of claim 8, further comprising: a riser module, connected to the motherboard, and including at least one of the group of electrical devices.

11. The computer system of claim 10, wherein the group of electrical devices comprises a group of codecs and the riser module comprises an Audio Modem Riser.

12. The computer system of claim 10, wherein:

if the presence signal indicates that none of the group of electrical devices is located on the motherboard, the routing module routes a signal from a first electrical device on the riser module to a default pin of the controller;

if the presence signal indicates that a second electrical device is located on the motherboard, the routing module shifts the routing of said signal from said first electrical device on the riser module to a pin of the controller other than said default pin.

13. The computer system of claim 8, further comprising an AC link to connect the electrical device controller to the routing module.

14. The computer system of claim 13, wherein an electrical device is located on the motherboard and is connected directly to the AC link.

15. The computer system of claim 8, wherein: at least one of the group of electrical devices includes at least one of an address ID module and a routing module.

16. In a computer system containing a motherboard, a group of electrical devices, a plug-in module including at least one of the group of electrical devices and connected to the motherboard, and an electrical device controller, a method for designating one of the group of electrical devices as a primary device and at least one of the electrical devices in the group of electrical devices as a secondary device, comprising:

providing an address ID module;

providing a routing module;

providing a presence signal to indicate whether one of the group of electrical devices is located on the motherboard;

if the presence signal indicates that one of the group of electrical devices is located on the motherboard:

operating the address ID module to designate one of the group of electrical devices a primary device by assigning a primary address to said electrical device located on the motherboard, operating the address ID module to assign a secondary address to at least one of the group of electrical devices, routing an output signal from said electrical device located on the motherboard to an input of the electrical device controller adapted for input from a primary electrical device, and operating the routing module to route an output signal from at least one of the group of electrical devices to at least one input of the device controller adapted for input from the secondary electrical device;

if the presence signal indicates that none of the group of electrical devices is located on the motherboard:

operating the address ID module to designate one of the group of electrical devices a primary device by assigning a primary address to said one of the group of electrical devices located on the plug-in module, operating the address ID module to assign a secondary address to at least one of the group of electrical devices located on the plug-in module, operating the routing module to route an output signal from the primary device to an input of the electrical device controller adapted for input from a primary electrical device, and operating the routing module to route an output signal from at least one of the group of electrical devices assigned a secondary address to at least one input of the controller device adapted for input from a secondary electrical device.

\* \* \* \* \*

UNITED STATES PATENT AND TRADEMARK OFFICE
CERTIFICATE OF CORRECTION

PATENT NO.    : 6,401,152 B1                                   Page 1 of 1
DATED         : June 4, 2002
INVENTOR(S)   : Solomon et al.

It is certified that error appears in the above-identified patent and that said Letters Patent is hereby corrected as shown below:

Column 5,
Line 22, change "4." to -- 4, --

Column 6,
Line 30, change "each" to -- each of the --
Line 44, change "systems." to -- systems, -- and Column 9,
Line 2, change "with in" to -- within --.

Signed and Sealed this

Twenty-first Day of January, 2003

JAMES E. ROGAN
*Director of the United States Patent and Trademark Office*